(12) United States Patent
Brochot et al.

(10) Patent No.: US 11,482,822 B2
(45) Date of Patent: Oct. 25, 2022

(54) WIRING METHOD INCLUDING A STEP OF ENROBING NON-SEALED CONNECTORS IN A RESIN

(71) Applicant: JTEKT EUROPE, Irigny (FR)

(72) Inventors: Patrice Brochot, Oullins (FR); Pascal Pauly, Brignais (FR); Laurent Rey, Villeurbanne (FR)

(73) Assignee: JTEKT EUROPE, Irigny (FR)

( * ) Notice: Subject to any disclaimer, the term of this patent is extended or adjusted under 35 U.S.C. 154(b) by 325 days.

(21) Appl. No.: 16/605,768

(22) PCT Filed: Apr. 19, 2018

(86) PCT No.: PCT/FR2018/050981
§ 371 (c)(1),
(2) Date: Oct. 16, 2019

(87) PCT Pub. No.: WO2018/197784
PCT Pub. Date: Nov. 1, 2018

(65) Prior Publication Data
US 2020/0052448 A1 Feb. 13, 2020

(30) Foreign Application Priority Data
Apr. 25, 2017 (FR) .................................. 17/53562

(51) Int. Cl.
*H01R 43/00* (2006.01)
*H01R 13/631* (2006.01)
(Continued)

(52) U.S. Cl.
CPC ......... *H01R 43/005* (2013.01); *H01R 13/631* (2013.01); *H01R 43/20* (2013.01); *B62D 5/04* (2013.01)

(58) Field of Classification Search
CPC ...... B62D 5/04; H01R 13/631; H01R 43/005; H01R 43/20
See application file for complete search history.

(56) References Cited

U.S. PATENT DOCUMENTS 7,922,526 B2 * 4/2011 Okada .................. H04N 5/2252
439/544
8,011,976 B2 * 9/2011 Ooki .................... H01R 13/521
439/736

(Continued)

FOREIGN PATENT DOCUMENTS

EP 0 999 601 A1 5/2000
EP 1263039 A2 12/2002
(Continued)

OTHER PUBLICATIONS

Jul. 6, 2018 International Search Report issued in International Patent Application No. PCT/FR2018/050981.

*Primary Examiner* — Carl J Arbes
(74) *Attorney, Agent, or Firm* — Oliff PLC

(57) ABSTRACT

A wiring method during which an electrical cable is connected, the cable including one or more conductive wires, to an electrical apparatus, such as a drive computer unit for assisted steering, by means of a non-sealed connector which includes a male portion placed in a junction box and connected to the electrical apparatus, and a female portion connected to the electrical cable, as well as retaining members for fixing the female portion on the male portion in order to create an electrical junction between the respective conductive terminals of the portions, the connector is then covered, after connection, with an enrobing polymer material which forms a sealed shell which protects the electrical junction at least from water.

13 Claims, 1 Drawing Sheet

(51) Int. Cl.
*H01R 43/20* (2006.01)
*B62D 5/04* (2006.01)

(56) References Cited

U.S. PATENT DOCUMENTS

| | | | |
|---|---|---|---|
| 2002/0101041 A1 * | 8/2002 | Kameyama | H01R 13/521 |
| | | | 277/628 |
| 2004/0171311 A1 | 9/2004 | Sichner et al. | |
| 2005/0255748 A1 | 11/2005 | Kameyama et al. | |
| 2010/0099279 A1 | 4/2010 | Homme et al. | |

FOREIGN PATENT DOCUMENTS

| | | |
|---|---|---|
| EP | 2278666 A1 | 1/2011 |
| EP | 2390963 A1 | 11/2011 |
| EP | 2 500 986 A2 | 9/2012 |
| FR | 2886065 A1 | 11/2006 |
| FR | 2908932 A1 | 5/2008 |
| WO | 03063300 A1 | 7/2003 |

* cited by examiner

WIRING METHOD INCLUDING A STEP OF ENROBING NON-SEALED CONNECTORS IN A RESIN

The present invention concerns the general field of methods called «wiring methods» that allow connecting an electrical cable to an electrical appliance.

The present invention concerns more particularly a method intended to connect one or more electrical cable(s) to a power-assist motor and/or to a calculator within a power steering system.

When connecting a cable to an electrical appliance within a vehicle, it is important to ensure that the connection is waterproof.

To this end, there is known in particular a method which consists in using one or more sealed connector(s), which are provided with sealing members, of the elastomer gaskets type, which ensure a waterproofness between the female portion and the male portion of the connector.

Nonetheless, such sealed connectors have in particular the drawback of being bulky and relatively expensive.

According to an alternative method, it is known to directly connect the electrical cable to the electrical appliance, by welding the stripped ends of the constituent wires of said electrical cable on tracks provided to this end on the electrical appliance, then to embed the assembly in a polymeric encapsulation material, such as a resin.

Nonetheless, a first difficulty of such a method is that it may be difficult to access the tracks and the ends of the wires to perform the weld, without damaging neighboring components or even the box that protects the electrical appliance and which may be made of a relatively heat-sensitive polymeric material.

Another difficulty is that it is sometimes difficult to maintain the wires in place, in contact with the tracks, during the welding operation. The tooling to be used may therefore be relatively complex and expensive.

Consequently, the objects assigned to the invention aim at overcoming the above-mentioned drawbacks and at proposing a new wiring method that allows connecting easily, inexpensively and sealingly, an electrical cable to an electrical appliance.

The objects assigned to the invention are achieved by means of a wiring method allowing connecting an electrical cable, comprising one or several conductive wire(s), to an electrical appliance, such as a power steering drive-calculator unit, said method comprising:

a preparation step (a) during which at least one connector is prepared which comprises on the one hand a first portion, called male portion, which carries at least one electrically-conductive first terminal, called male terminal, and on the other hand a second portion, called female portion, which is distinct of the male portion and which carries at least one electrically-conductive second terminal, called female terminal, said connector also comprising at least one retaining member which allows maintaining the male portion against the female portion such that the at least one male terminal is in contact with the at least one female terminal, the electrical appliance is equipped with a connection box, within which the male portion of the connector is placed, and the male terminal is electrically connected to the electrical appliance, the electrical cable is equipped with the female portion of the connector, and the female terminal is electrically connected to at least one conductive wire, then a connection step (b), during which the female portion of the connector is engaged and fixed on the male portion of said connector by means of the at least one retaining member, so as to create and maintain a weldless electrical junction between the male terminal and the female terminal, then an encapsulation step (c), during which the connection box is filled with a polymeric encapsulation material which covers the male and female portions of the connector so as to form a sealed envelope which protects at least the weldless electrical junction from liquid water.

Advantageously, the invention allows combining the advantages of the use of a connector (or of several connectors), which ensures an accurate positioning and a solid mechanical holding of their male and female electrical terminals, one in contact with each other, without the necessity of making any welding, with the advantages of achieving a sealing to liquid water that does not depend on said connectors, and in this instance that is obtained in a simple and fast manner by encapsulating said connector(s) in a polymeric encapsulation material, which allows in particular using, preferably, unsealed connectors, devoid of any elastomeric gaskets, and which consequently have a reduced volume and a lower cost.

Other objects, features and advantages of the invention will appear in further detail upon reading the following description, as well as by using the appended drawings, provided for purely illustrative and non-limiting purposes, among which:

The present invention concerns a wiring method allowing connecting an electrical cable 1, comprising one or several conductive wire(s) 2, to an electrical appliance 3.

Said electrical appliance 3 may preferably be an electric motor 4, in particular an electric power-assist motor for a power steering system, or a calculator 5, in particular a power steering calculator, or else an assembly comprising a power-assist motor 4 and a power steering calculator 5, called «drive-calculator unit».

Figure 1:
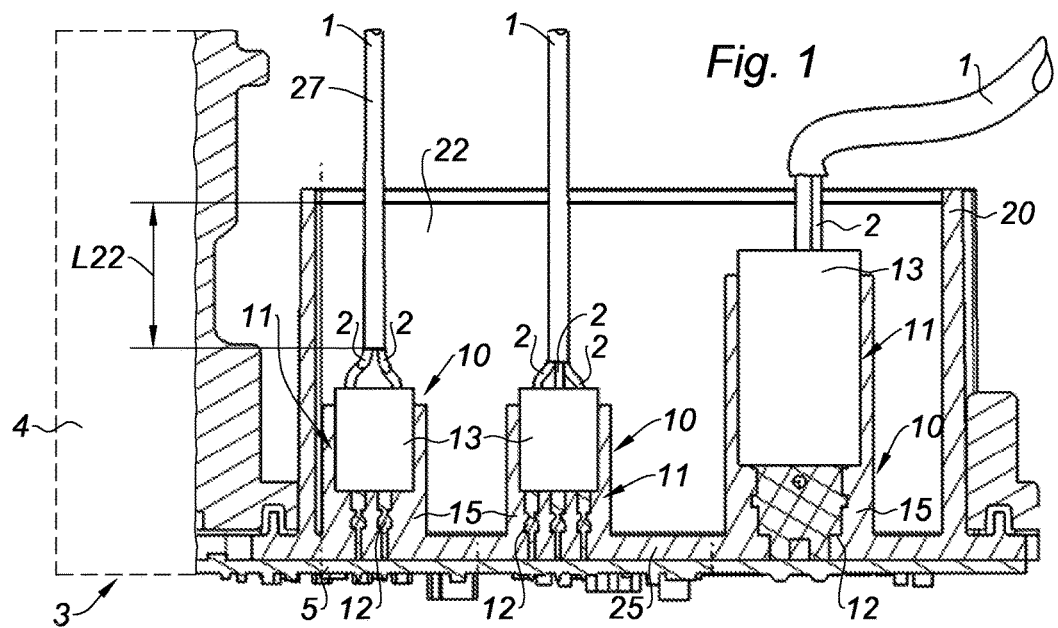
FIG. 1 illustrates, according to a side sectional view, an example of an electrical appliance comprising an electronic board connected to several electrical cables by a wiring method according to the invention.

As illustrated in FIG. 1, the calculator 5 may be in the form of an electronic board, and may, for convenience of description, be assimilated to an electronic board 5 in what follows.

According to the invention, the method comprises a preparation step (a) during which at least one connector 10 is prepared which comprises on the one hand a first portion 11, called male portion 11, which carries at least one electrically-conductive first terminal 12, called male terminal 12, and on the other hand a second portion 13, called female portion 13, which is distinct from the male portion 11 and which carries at least one electrically-conductive second terminal 14, called female terminal 14.

Figure 2:
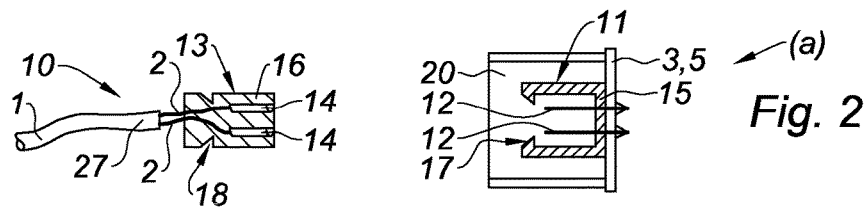
FIG. 2 illustrates, according to a schematic side sectional view, an example of a preparation step (a) according to the invention, during which the electrical appliance and the electrical cable are equipped with their respective connector portion.

Preferably, as shown in particular in FIG. 2, the male portion 11 of the connector 10 comprises a first base 15, called male base 15, which is electrically-insulating and which serves as a support for the at least one male terminal 12, whereas the female portion 13 of said connector 10 comprises a second base 16, said female base 16, which is electrically-insulating and which serves as a support for the at least one female terminal 14.

The base 15, 16, which is preferably rigid, advantageously allows maintaining the male terminal(s) 12, respectively the female terminal(s) 14, in a fixed position relative to each other, and relative to the corresponding connector portion 11, 13, according to an ordered and fixed predetermined spatial arrangement, which simplifies in particular the connection of the male portion 11 on the female portion 13.

Furthermore, the base 15, 16 facilitates the handling of the corresponding connector portion 11, 13.

Preferably, the base 15, 16 is made of a polymeric material, preferably rigid, both lightweight and electrically-insulating material.

The female base 16, and more generally the female portion 13, will preferably have a substantially shape matching to the male base 15, and more generally to the male portion 11, so as to enable nesting during the connection.

Figure 3:
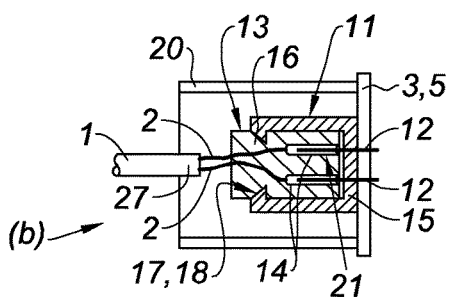
FIG. 3 illustrates, according to a schematic side sectional view, an example of a connection step (b) during which the male and female portions of the connector of FIG. 2 are mechanically joined and assembled so as to mechanically and electrically connect the electrical cable on the electrical appliance.
Figure 4:
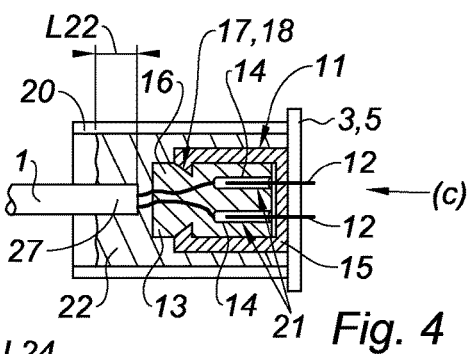
FIG. 4 illustrates, according to a schematic side sectional view, an example of an encapsulation step (c), during which the connection is made sealed to liquid water by filling the connection box with a polymeric encapsulation material, initially liquid, of the resin type.

Preferably, the male terminal(s) 12 may be formed by rigid metal pin(s), respectively rigid metal pin(s), and the female terminal(s) 14 may be formed by tab(s) or metal socket(s). It should be noted that the notions of «male» and «female» are used for clarity purposes, and do not prejudge the respective shape of the connector portions 11, 13, although, as illustrated in FIGS. 2 to 4, the male terminals 12 may preferably be projecting in order to penetrate into preferably reentrant female terminals 14, with a substantially matching shape, and for example with a tubular or split tubular shape.

In a particularly preferred manner, the electrical cable 1 comprises several conductive wires 2 electrically insulated from each other and thus forming distinct circuits.

Similarly, the electrical appliance may comprise several tracks or several separate circuits.

The male base 15 will then preferably serve as a grouped support for a plurality of electrically-conductive male terminals 12 each electrically connected to the track or to the circuit of the electrical appliance corresponding thereto, whereas the female base 16 will serve as a grouped support for a plurality of electrically-conductive female terminals 14, each electrically connected to one of the conductive wires 2, and each arranged to correspond to one of the male terminals 12.

Thus, the connector 10 will preferably comprise several channels, and will advantageously allow connecting several circuits in one single connection operation.

The connector 10 also comprises at least one retaining member 17, 18 which allows maintaining the male portion 11 against the female portion 13 such that the at least one male terminal 12 is in contact with the at least one female terminal 14.

The at least one retaining member 17, 18 therefore allows forming a mechanical junction between the male portion 11 and the female portion 13, and more preferably between the male base 15 and the female base 16, in order to hold the male portion 11 together with the female portion 13, and more particularly in order to hold the male terminal 12 together with the female terminal 14.

This mechanical junction is sufficiently strong to prevent the male portion 11 from spontaneously detaching itself from the female portion 13, and consequently to prevent the male 12 and female 14 terminals from separating, after the connection step (b) and before, and during and after, the encapsulation step (c).

This mechanical junction is furthermore sufficiently restrictive to maintain the male terminal(s) 12 in contact with and bearing against the corresponding female terminals 14, that is to say to ensure and maintain an electrical junction within the connector 10 after the connection step (b) and before, then during and after, the encapsulation step (c).

According to one embodiment, the male 17 and female 18 retaining members may be formed by the male 12 and female 14 terminals themselves.

To this end, said male 12 and female 14 terminals may be arranged to elastically nest into one another, so that the male terminal 12, preferably formed by a solid pin, is maintained by elastic pinching by and against, or even in, the female terminal 14, then preferably formed by a split cylindrical sleeve which clasps the male pin 12.

The clamping (typically concentric clamping) of one terminal 12 in the other terminal 14 will ensure a sufficiently strong fastening to prevent an accidental wrenching before and during the encapsulation step (c).

According to another preferred embodiment, possibly complementary to the previous one, it is the insulating male 15 and female 16 bases, which can be arranged to elastically nest into one another, the fastening of the male base 15 on the female base 16 then being ensured by elastic clamping, typically by concentric clamping of a base 15 on the other base 16.

It should be noted that the aforementioned two embodiments can be implemented by means of connector portions 11, 13 with a simple and particularly compact shape, and in particular which have smooth walls, such that said connector portions are easy and inexpensive to make by molding.

According to another possible variant, the retaining members 17, 18 can effectively form locking members, which, once engaged, advantageously provide a non-return effect which resists any extraction maneuvering of the female portion 13 out of the male portion 11, unless, optionally, the operator deliberately performs a specific unlocking maneuvering to release the female retaining members 18 from the male retaining members 17.

Such a locking has in particular the effect of preventing any spontaneous mutual separation of the male 11 and female 13 connector portions of the connector when simply exerting a tension on the electrical cable 1.

This being so, the at least one retaining member 17, 18 will preferably be arranged so as to be manually reversible, that is to say, will enable, provided that the operator performs a specific unlocking maneuvering, an opening of the connector 10 by separation of the male portion 11 and of the female portion 13.

Of course, to this end, any appropriate configuration of the retaining members 17,18 may be used to ensure a locking.

Thus, there could be considered in particular retaining members 17, 18 capable of ensuring the mechanical fastening of the female base 16 on the male base 15, by screwing, or by bayonet locking (quarter turn), or by snap-fitting, etc.

Preferably, for convenience of manufacture and implementation, the male 17 and female 18 retaining members cooperate by snap-fitting.

To this end, and as illustrated in FIGS. 2, 3 and 4, the male retaining members 17 may advantageously comprise elastically flexible tabs provided with hooks, which fit into female retaining members 18 formed by notches.

Such an arrangement advantageously allows obtaining an automatic locking of the connector 10, as soon as the male 11 and female 13 portions are properly connected to one another.

During the preparation step (a), the electrical appliance 3, 4, 5 is also equipped with a connection box 20, within which the male portion 11 of the connector is placed, and the male terminal 12 is electrically connected to the electrical appliance 3, 4, 5, as illustrated in FIG. 2.

The connection box 20 may take on substantially the shape of a basin, for example a parallelepiped shape, whose side walls, preferably made of a rigid polymeric material, surround the male portion 11 of the connector and preferably exceed said male portion 11 in height.

The bottom of said basin may advantageously be adjoined to the electrical appliance 3, 4, 5, and more particularly be adjoined to the electronic board forming the calculator 5, or may even be formed by an insulating element of said electrical appliance 3, 4, 5, such as a casing element made of a rigid polymeric material or an insulating face of the aforementioned electronic board 5.

The connection of the male terminal(s) 12 to the electrical appliance 3, 4, 5 may in particular be performed by welding said male terminals 12 to the electronic board 5, as illustrated in particular in FIG. 2.

During preparation step (a), the electrical cable 1 is also equipped with the female portion 13 of the connector 10, and the female terminal 14 is electrically connected to at least one conductive wire 2, as illustrated in particular in FIG. 2.

Afterwards, the method comprises a connection step (b) during which the female portion 13 of the connector is engaged and fixed on the male portion 11 of said connector (which has been initially separated from the female portion 13 during the preparation step (a)), by means of the at least one retaining member 17, 18, so as to create and maintain an electrical junction 21 between the (each) male terminal 12 and the corresponding female terminal 14, as illustrated in particular in FIG. 3.

In other words, the male portion 11 and the female portion 13 are joined and assembled to reconstitute the connector 10 and, in doing so, electrically plug the male terminals 12 on their respective female terminals 14.

As indicated above, the use of a connector 10, provided with retaining members 17, 18 which are actuated during the connection step (b) to ensure a standalone mechanical holding of the male 11 and 13 female portions against each other, allows easily achieving a durable and solid electrical connection between the male 12 and female 14 terminals, both before the encapsulation step (c) and during encapsulation step (c).

This avoids any positioning error of the terminals 12, 14 and any risk of false contact during wiring.

In a particularly preferred manner, the use of a mechanical connector 10 allows making a weldless electrical junction 21.

The term «weldless electrical junction 21» means a junction according to which the electrical contact between the male terminals 12 and female terminals 14 is established through a mechanical stress process, without melting the metal (or the conductive material) constituting the terminals 12, 14 nor melting any possible filler metal (or conductive material), that is to say without any welding operation or soldering operation.

Thus, the electrical junction 21 is operated in a simple and inexpensive way, without it being necessary in particular to heat the terminals 12, 14, or the surroundings of the connector 10 or of the connection box 20, at a temperature which would be higher than the melting temperature of the filler metal or of the constituent metal of terminals 12, 14, and even more so that it would be higher than the melting temperature of the material constituting the connection box 20 or of the constituent material of the bases 15, 16 of the male 11 and female 13 portions of the connector 10.

This avoids any thermal damage to the parts to be wired.

Afterwards, the method comprises an encapsulation step (c), during which the connection box 20 is filled with a polymeric encapsulation material 22, preferably a resin, which covers the male 11 and female 13 portions of the connector 10 so as to form a sealed envelope which protects at least the electrical junction 21 from liquid water, herein preferably the weldless electrical junction 21.

More specifically, the encapsulation material 22, which is preferably poured in the liquid state into the connection box 20, which allows containing said encapsulation material 22 in the vicinity of the connector 10 during its solidification, covers the male 11 and female 13 portions, and more particularly the corresponding bases 15, 16, as well as the apparent joint plane between said male 11 and female 13 portions, to form, with the bases 15,16 and around them, a monolithic block that prevents any intrusion of water into the connector 10, and more particularly which prevents any infiltration of water at the interface between said bases 15, 16, through the joint plane which marks, outside the connector 10, the separation limit between said bases 15,16.

Advantageously, the encapsulation material 22 serves as a barrier at least to liquid water, and potentially also to other liquids likely to be in the environment of the electrical appliance 3, 4, 5, such as lubricant, fuel, brake fluid, coolant, etc., and thus prevents said liquids from entering into the connector 10 and reaching the electrically-conductive terminals 12, 14, and more generally the electrical circuits associated with said terminals 12, 14, from the outside of the connector 10.

The electrical junction 21 is thus protected against short-circuits and corrosion.

The connector 10, the arrangement of the connection box 20 and the encapsulation material 22 will be selected so as to ensure a sealing to liquid water (runoff water, drops of water projected by the wheels from the road, salt spray, etc.) within a pressure range that will extend from normal atmospheric pressure (typically 1 bar) to at least 10 bar, at least 50 bar, or even up to 100 bar, so as to withstand both a gravitational runoff of water and a jet of a high-pressure cleaner, and more particularly so as to be able to withstand the jet from a high-pressure cleaner which imparts to the water a nominal pressure comprised between 80 and 100 bar, a temperature from 70° C. to 80° C., when the nozzle of the cleaner directs said water jet on the connection box 20 at a distance comprised between 80 mm and 300 mm from said box.

Preferably, once solidified, the encapsulation material 22 is rigid enough to ensure a solid holding of the connector 10 in the box, while still avoiding causing the occurrence of mechanical stresses between the male 11 and female 13 portions or between the connector 10 and the connection box 20, in particular in case of rapid and high temperature variation (thermal shock).

To this end, the encapsulation material will preferably be an epoxy resin, or else a silicone or polyurethane type elastomer.

Preferably, in addition to serving as a support for at least one male terminal 12, the male base 15 of the connector 10 also serves as a support to at least one first retaining member 17, called male retaining member 17, which is distinct from said at least one male terminal 12.

Preferably, for convenience of manufacture, and as illustrated in particular in FIGS. 2 to 4, said first retaining member 17 will be integrally formed with said male base 15, preferably in the same rigid polymeric block.

Similarly, the female base 16 preferably also serves as a support to a second retaining member, called «female retaining member» 18, which is distinct from the female terminal 14, and which is preferably integrally formed with said 14, and which is arranged to be engaged with the first retaining member (male) 17, during the connection step (b), in order to create and maintain a mechanical junction between the male 11 and female 13 portions of the connector.

Thus, ultimately, during the connection step (b), the female portion 13 of the connector is engaged on (or into, or even above) the male portion 11 of the connector so as to make between said male 11 and female 13 portions of the connector 10 on the one hand a mechanical junction, according to which the female retaining member 18 is engaged with the male retaining member 17 (or vice versa) so as to fix and retain the female portion 13 on the male portion 11 and to resist the mutual separation of said male and female portions, and on the other hand an electrical junction 21, herein preferably a weldless junction, which is retained by the mechanical junction, and according to which the female terminal 14 comes and remains in electrical contact with the male terminal 12.

In this way, preferably, the electrical junction function, ensured by the terminals 12, 14, of the mechanical junction function ensured by the bases 15, 16 and their retaining members 17, 18 may advantageously be dissociated.

It is therefore possible to make between the male portion 11 and the female portion of the connector 13 a solid mechanical junction, capable of withstanding at least a certain threshold of a pulling force of a predetermined value, without any risk of damaging or weakening the electrically-conductive terminals 12, 14.

Consequently, said terminals 12, 14 can be relatively thin, light and barely cumbersome.

As indicated above, the male retaining members 17 of the male base 15 and the female retaining members 18 of the female base 16 may preferably cooperate by snap-fitting.

Preferably, the sub-assembly formed by the male 11 and female 13 portions of the connector 10 assembled and maintained by the retaining member (or the members) 17, 18 during the connection step (b), and more particularly the sub-assembly formed by the joining and the mechanical junction of the male 15 and female 16 bases, is not sealed to liquid water, before the encapsulation step (c).

As such, the connector 10 may in particular preferably be devoid of any elastomer gasket adapted to create and ensure a sealing to liquid water between the male portion 11 and the female portion 13 of the connector 10 (and more particularly between the male base 15 and the female base 16) during the connection step (b).

In other words, the invention allows using one or more connector(s) that are intrinsically not waterproof, and therefore relatively compact and inexpensive, since it is the encapsulation operation, subsequent to the connection operation, which makes said connector 10 sealed (at least to water), thanks to the addition of the encapsulation material 22 which remedies the lack of sealing (to water) that initially exists between the bases 15, 16 (and which would enable, in absolute terms, liquid water to enter into the bare connector 10, up to the terminals 12, 14).

Yet, the respective bases 15, 16 of the male portion 11 and of the female portion 13 of the connector 10 are preferably arranged so that, once the connection step (b) is completed, said bases 15, 16 wrap the electrical junction 21 in a sealed manner to the polymeric encapsulation material 22, when the latter is in the liquid state, so as to prevent an intrusion of said polymeric encapsulation material 22 at the level of the electrical junction 21 during the encapsulation step (c).

In other words, the connector 10 preferably used is intrinsically sealed to the liquid encapsulation material (resin) 22, in particular, where appropriate, within the pressure range used to inject said encapsulation material, but not intrinsically sealed to liquid water.

Advantageously, by protecting the terminals 12, 14, and more particularly the electrical junction 21, from the encapsulation material 22, it is avoided that the encapsulation material creates, during the encapsulation step (c), a false contact by spacing the male 12 and female 14 terminals from each other or by forming an electrically-insulating film therebetween.

To this end, the female base 16 of the connector 10 may for example preferably have a tubular shape delimited by a side wall 23, and into which the male base 15 is engaged during the connection step (b) or, conversely, the male base 15 may have a tubular shape delimited by a side wall, into which the female base 16 is engaged during the connection step (b).

Thus, one of the bases 15, 16 can form substantially a kind of bell that comes to cover the other base 16, 15.

Figure 5:
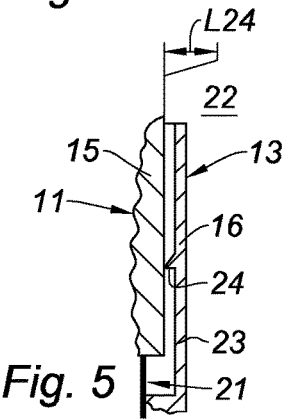
FIGS. 5 and 6 illustrate, according to detailed side sectional views, examples of protrusions provided in the base of a connector female portion in order to ensure the sealing of said connector to the liquid polymeric encapsulation material during the encapsulation step (c).
Figure 6:
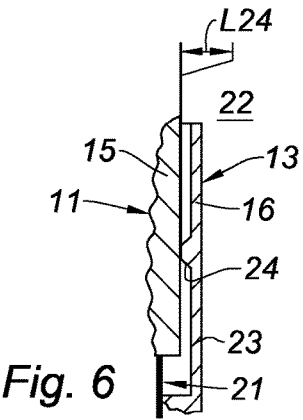

Advantageously, the side wall 23 of the female base 16 and/or the male base 15, or vice versa, then preferably includes, as illustrated in FIGS. 5 and 6, protrusions 24, of the deflector or lip type, which create with the other base 16, 15 at least one baffle and/or at least one constriction, sealed to the polymeric encapsulation material 22 in the liquid state.

Said baffle, or said constriction, created by the protrusion 24, advantageously limits the width of the passage section between the base 15 and the female base 16 to a value such that, while enabling the engagement of the male base 15 into the female base 16 (or conversely), it blocks the liquid encapsulation material 22 at a distance from the electrical junction 21, in order to avoid any infiltration of said encapsulation material 22 into the area of said electrical junction 21.

For indication, the passage width L24 will thus be made smaller than or equal to 0.3 mm, or even preferably equal to or smaller than 0.1 mm.

Moreover, it is possible to provide a plurality of such baffles or such constrictions within the same connector 10, to constitute as many successive obstacles to the infiltration of the encapsulation material 22.

According to a preferred possibility of implementation which corresponds in particular to FIG. 1, the method allows connecting several distinct electrical cables 1, each comprising one or several conductive wire(s) 2, to the electrical appliance 3, 4, 5.

Preferably, during the preparation step (a), several connectors 10 are then provided, whose respective male portions 11 are placed in the connection box 20, and each electrical cable 2 is equipped with a corresponding connector female portion 13, and, during the connection step (b), each female portion 13 is connected to the male portion 11 corresponding thereto (and more particularly each female base 16 is fixed on the male base 15 corresponding thereto by making a mechanical junction as described above), so as to achieve and maintain within each connector 10 of the plurality of connectors an electrical junction 21, herein a weldless junction, as has been explained above, then, during the encapsulation step (c), all of the plurality of connectors 10 are embedded in one single block of the polymeric encapsulation material 22.

Advantageously, one single coating operation is thus sufficient to confer in a simple and rapid manner a sealing, at least to liquid water, on all the connectors 10 which were initially unsealed.

In a particularly preferred manner, each of the male portions 11 of the different connectors may then include a male base 15 made of an electrically-insulating material, as described above, and said male bases 15 of the different connectors 10 can then be integrally formed with each other.

In practice, all of the male bases 15 of the connectors 10 can thus be joined into one monolithic part 25 made of a rigid polymer, preferably thermoplastic, said monolithic part 25 preferably forming the bottom of the connection box 20 in which the encapsulation material 22 is poured, as illustrated in FIG. 1.

This will thus simplify the manufacture and installation of the male bases 15 within the electrical appliance 3, 4, 5.

Figure 7:
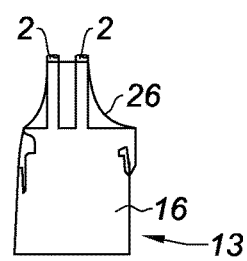
FIG. 7 illustrates, according to a schematic side sectional view, the installation of a heat-shrinkable sheath which covers part of the female portion of the connector and the corresponding end of the electrical cable, so as to prevent the intrusion of the polymeric encapsulation material between the electrical cable and the female portion of the connector during the encapsulation step (c).

According to a possible variant of implementation, and as illustrated in FIG. 7, the method may comprise a dressing step, which precedes the encapsulation step (c), and during which a heat-shrinkable sheath 26 is put in place which covers part of the female portion 13 of the connector 10 and the corresponding end of the electrical cable 1, so as to prevent the intrusion of polymeric encapsulation material 22 between the electrical cable 1 and the female portion 13 of the connector during the encapsulation step (c).

According to such a variant, it is advantageously not necessary to confer on the female portion 13, and more particularly on the female base 16, a complex shape intended to prevent the infiltration of the encapsulation material 22 into the connector 10, along the wires 2.

Moreover, irrespective of the considered variant of the method, the electrical cable 1 may preferably comprise a sheath 27 from where the conductive wires 2 electrically connected to the at least one female terminal 14 emerge.

During the encapsulation step (c), the polymeric encapsulation material 22 which covers the connector 10 will then preferably also cover said sheath 27 over a length L22 at least equal to 3 mm, and for example comprised between 3 mm and 10 mm.

Such a coverage will improve both the mechanical anchorage of the cable 1 on the connector 10, and the sealing (to water) of the assembly.

The invention of course concerns as such a system embedded on a vehicle, and in particular a power steering system, which comprises an electrical appliance 3, and in particular a calculator 5, an electric motor 4, a sensor, or a drive-calculator unit 4, 5, wired according to a method in accordance with the invention, as well as a vehicle, and in particular a motor vehicle, equipped with such an embedded system.

The invention further concerns as such the use of connectors 10 which are not waterproof (that is to say in particular intrinsically devoid of any elastomer gaskets which would allow ensuring a waterproofness between the male and female portions), embedded in a resin-type polymeric encapsulation material 22, for making an electrical connection between an electrical cable 1 and an electrical appliance 3.

Moreover, the invention is not limited to the above-mentioned variants, a person skilled in the art being in particular able to isolate or freely combine together either one of the features described in the foregoing or to substitute them with an equivalent.

Thus, in particular, it would also be possible to consider a method in which a connector 10, preferably a connector which is not sealed to liquid water, is prepared, whose male portion 11 comprises a rigid base 15 which maintains a plurality of distinct male terminals 12 in a fixed position according to a predetermined spatial arrangement (relative to said base), and whose female portion 13 would likewise comprise a rigid base 16, preferably with a shape substantially matching to the shape of the base 15 of the male portion, and which maintains several distinct female terminals 14, in a fixed position and according to an arrangement corresponding to that of the male terminals 12, during which the male terminals 12 are connected to different conductors of the electrical appliance 3, respectively the female terminals 14 to different conductive wires 2 of one or several cable(s) 1, then during which the mechanical junction of said male 11 and female 13 portions is achieved and in doing so the electrical junction 21 of the male 12 and female 14 terminals, preferably a weldless junction, then an encapsulation of said connector 10 is made by a polymeric encapsulation material 22 forming an envelope sealed to liquid water, as indicated above.

The invention claimed is:

1. A wiring method allowing connecting an electrical cable, comprising one or several conductive wire(s), to an electrical appliance, the method comprising:
    a preparation step (a) during which
        at least one connector is prepared which comprises on the one hand a first portion, called male portion, which carries at least one electrically-conductive first terminal, called male terminal, and on the other hand a second portion, called female portion, which is distinct from the male portion and which carries at least one second electrically-conductive terminal, called female terminal, the connector also comprising at least one retaining member which is a distinct mechanical structure that allows maintaining the male portion against the female portion so that the at least one male terminal is in contact with the at least one female terminal,
        the electrical appliance is equipped with a connection box, within which the male portion of the connector is placed, and the male terminal is electrically connected to the electrical appliance,
        the electrical cable is equipped with the female portion of the connector, and the female terminal is electrically connected to at least one conductive wire, then a connection step (b), during which the female portion of the connector is engaged and fixed on the male portion of the connector by means of the at least one retaining member, so as to create and maintain a weldless electrical junction between the male terminal and the female terminal, then an encapsulation step (c), during which a polymeric encapsulation material in a liquid state is poured into the connection box, so as to fill the connection box with the polymeric encapsulation material which covers the male and female portions of the connector to form a sealed envelope which protects at least the weldless electrical junction from liquid water.

2. The wiring method according to claim 1, wherein the sub-assembly formed by the male and female portions of the connector assembled and maintained by the retaining member during the connection step (b) is not sealed to liquid water, before the encapsulation step (c).

3. The wiring method according to claim 1, wherein the connector is devoid of any elastomer gasket adapted to create and ensure sealing to liquid water between the male portion and the female portion of the connector during the connection step (b).

4. The wiring method according to claim 1, wherein the male portion of the connector comprises a first base, called male base, which is electrically-insulating and which serves as a support for the at least one male terminal, whereas the female portion of the connector comprises a second base, called female base, which is electrically-insulating and which serves as a support for the at least one female terminal.

5. The wiring method according to claim 4, wherein the male base of the connector also serves as a support for at least one first retaining member which is distinct from the at least one male terminal, and which is integrally formed with the male base, whereas the female base serves as a support for a second retaining member which is distinct from the female terminal, and which is integrally formed with the female base, and which is arranged to be engaged with the male retaining member, during the connection step (b), in order to create and maintain a mechanical junction between the male and female portions of the connector, which resists the separation of the male and female portions and maintains the electrical junction between the male and female terminals.

6. The wiring method according to claim 5, wherein the male and female retaining members cooperate by snap-fitting.

7. The wiring method according to claim 4, wherein the respective bases of the male portion and of the female portion of the connector are arranged so that, once the connection step (b) is completed, the bases wrap the electrical junction in a sealed manner to the polymeric encapsulation material when it is in the liquid state, so as to prevent an intrusion of the polymeric encapsulation material at the level of the electrical junction during the encapsulation step (c).

8. The wiring method according to claim 7, wherein the female base of the connector has a tubular shape delimited by a side wall, and wherein the base of the male portion is engaged during the connection step (b), and in that the side wall of the female base and/or the male base includes protrusions, of the deflector or lip type, which create with the other base at least one baffle and/or at least one constriction, sealed to the polymeric encapsulation material in the liquid state.

9. The wiring method according to claim 1, wherein it allows connecting several distinct electrical cables, each comprising one or several conductive wire(s) to the electrical appliance, wherein, during the preparation step (a), several connectors are provided, whose respective male portions are placed in the connection box, and each electrical cable is equipped with a corresponding connector female portion, in that, during the connection step (b), each female portion is connected to the male portion corresponding thereto, so as to achieve and maintain within each connector of the plurality of connectors a weldless electrical junction, and in that, during the encapsulation step (c), all of the plurality of connectors are embedded in one single block of the polymeric encapsulation material.

10. The wiring method according to claim 9, wherein each of the male portions of the different connectors includes a male base made of an electrically-insulating material, and in that male bases of the different connectors are integrally formed with each other.

11. The wiring method according to claim 1, wherein it comprises a dressing step, during which a heat-shrinkable sheath is put in place which covers part of the female portion of the connector and the corresponding end of the electrical cable, so as to prevent the intrusion of polymeric encapsulation material between the electrical cable and the female portion of the connector during the encapsulation step (c).

12. The wiring method according to claim 1, wherein the electrical cable comprises a sheath from where the conductive wires electrically connected to the at least one female terminal emerge, and in that, during the encapsulation step (c), the polymeric encapsulation material which covers the connector also covers the sheath over a length at least equal to 3 mm.

13. A power steering system comprising an electrical appliance wired by a wiring method according to claim 1.

* * * * *